United States Patent [19]

Nishi et al.

[11] Patent Number: 5,330,036
[45] Date of Patent: Jul. 19, 1994

[54] MECHANICAL BRAKE FOR A HOIST AND TRACTION MACHINE

[75] Inventors: Yoshio Nishi; Haruo Kubota; Yoshio Ueno; Munenobu Honda, all of Osaka Sayama, Japan

[73] Assignee: Elephant Chain Block Company Limited, Osaka, Japan

[21] Appl. No.: 154,388

[22] Filed: Nov. 18, 1993

Related U.S. Application Data

[63] Continuation of Ser. No. 856,646, Mar. 24, 1992, abandoned.

[30] Foreign Application Priority Data

Oct. 31, 1991 [JP] Japan ................. 3-286893

[51] Int. Cl.5 .............. F16D 13/64; F16D 65/02; F16D 69/02
[52] U.S. Cl. ................ 188/251 M; 188/218 XL; 188/250 G; 192/107 M
[58] Field of Search ............... 188/71.5, 73.1, 218 R, 188/218 XL, 250 G, 251 R, 251 A, 251 M; 192/107 M

[56] References Cited

U.S. PATENT DOCUMENTS

| | | | |
|---|---|---|---|
| 3,791,493 | 2/1974 | Yamaguchi et al. | 188/251 M |
| 4,011,055 | 3/1977 | Hill et al. | 188/251 A X |
| 4,290,510 | 9/1981 | Warren | 188/218 XL |
| 4,403,047 | 9/1983 | Albertson | 188/251 A X |
| 4,605,105 | 8/1986 | Ogiwara | 188/251 M |
| 4,715,486 | 12/1987 | Burgdorf et al. | 192/107 M |

FOREIGN PATENT DOCUMENTS

| | | | |
|---|---|---|---|
| 62738 | 4/1984 | Japan | 188/218 XL |
| 144831 | 8/1984 | Japan | 188/218 XL |
| 205031 | 10/1985 | Japan | 188/218 XL |
| 63-142389 | 9/1988 | Japan . | |
| 63-219597 | 9/1988 | Japan . | |
| 138527 | 5/1990 | Japan | 188/218 XL |
| 2134425 | 5/1990 | Japan | 188/218 XL |
| 2219894 | 9/1990 | Japan . | |
| WO8302124 | 6/1983 | PCT Int'l Appl. . | |
| WO8909889 | 10/1989 | PCT Int'l Appl. . | |
| WO9110840 | 7/1991 | PCT Int'l Appl. . | |
| WO9208909 | 5/1992 | PCT Int'l Appl. . | |
| 629905 | 9/1949 | United Kingdom | 188/218 XL |

Primary Examiner—Robert J. Oberleitner
Assistant Examiner—Alfred Muratori
Attorney, Agent, or Firm—Stevens, Davis, Miller & Mosher

[57] ABSTRACT

A mechanical brake for a hoist and traction machine, which is provided with brake releasing force control layers at braking surfaces of a driving member opposite to lining plates. Each of the brake releasing force control layers comprising a heat-treated plating layer made of nickel phosphate, nickel chromium or chromium, so that the surface condition of each braking surface of the driving member can be controlled and the surface hardness can be controlled, whereby an initial force for the brake releasing during the lowering of a load or the releasing traction of a load is adapted to be lower.

8 Claims, 2 Drawing Sheets

MECHANICAL BRAKE FOR A HOIST AND TRACTION MACHINE

This application is a continuation of application Ser. No. 07/856,646, filed Mar. 24, 1992, now abandoned.

FIELD OF THE INVENTION

The present invention relates to a mechanical brake for a hoist and traction machine, and more particularly to a mechanical brake for a hoist and traction machine provided with lining plates and a braking member having at both sides thereof braking surfaces opposite to the lining plates respectively.

BACKGROUND OF THE INVENTION

The conventional hoist and traction machine, as disclosed in, for example, the Japanese Utility Model Laid-Open Gazette No. Sho 63-142389, has been used in a lever type hoist and traction machine, a manual hoist and traction machine or a motor-driven hoist and traction machine. The mechanical brake comprises a driven member rotatable together with a driving shaft, a driving member forwardly screwable therewith, a braking ratchet wheel engageable with a braking pawl, and lining plates disposed to sandwich therebetween the braking ratchet wheel, the ratchet wheel and lining plates being interposed between the driven member and the driving member. For example, in the manual hoist and traction machine, when a load is hoisted or haulded, the driving member is driven by a lever, a hand wheel or the like, so that the driving member, when driven, screws toward the driven member to bring the braking surface of the driving member into press-contact with one lining plate and further screws forward to bring one lining plate and the other into press-contact with the braking surfaces of the driven member and braking ratchet wheel respectively, thereby transmitting a braking force from the driven member to the driving shaft. Also, when the driving member is subjected to no driving input, the braking ratchet wheel engages with the braking pawl so as to be stationary and to restrain reverse rotation and the mechanical brake operates to brake the reverse rotation of the driving shaft caused by a load, thereby enabling the load to be held in the state of being hoisted or haulded.

In a case where such braking slate is released to lower the load or release traction thereof, the driving member is reversely rotated to screw brackwardly with respect to the lining plate, thereby releasing the braking force.

In a case where the load is lowered or the traction thereof is released during the operation of the mechanical brake, the driving member is reversely rotated to screw backwardly, thereby releasing the braking action of the mechanical brake as the above-mentioned, in which a predetermined releasing force corresponding to the load, but changeable therewith at the initial stage, is required. In other words, when the load acts on a load sheave in association with the driving shaft, a force by the load, which is intended to reversely rotate the load sheave, is transmitted to the driving member and allows it to screw toward the lining plate, the force being converted into a tightening force for the lining plate and becomes larger as the load is larger. Therefore, for lowering the load or the releasing the traction, the driving member braked by the tightening force screws backwardly to release the braking action and in the initial stage of screwing backwardly the driving member to release its braking action, a force overcoming the tightening force must be input into the lever or hand wheel for screwing backwardly the driving member. In other words, when the load is lowered by the lever or the like, a relatively smaller force than the tightening force set corresponding to the load, after the load lowering has started, can be used to lower the load, but in the initial stage of load-lowering operation a large releasing force corresponding to the tightening force is required.

In the state where cargos on a load carrying platform of a truck are tightened by traction operation of the machine, when the traction and cargo-tightening are released, in the initial stage, similarly, a large releasing force caused by backward screw of the driving member and corresponding to the tightening force of the mechanical brake is required.

However, in the conventional mechanical brake, the braking surfaces of the driving member, driven member and braking ratchet wheel, all are formed of the surface of raw material so as not to control the coefficient of friction, whereby the release of braking force at the initial stage of load lowering operation varies so that the releasing force larger than the tightening force corresponding to the load may be required. And, depending on the material of lining plates, the above-mentioned members may be attacked by the lining plate to vary in the surface condition, or an external condition, such as rusting, may be added to vary the surface condition, whereby the coefficient of friction increases so as to increase the required releasing force and occasionally the braking action cannot be released.

SUMMARY OF THE INVENTION

The present invention has been designed by studying that the brake releasing force transmitted from the lever to the driving member is governed mainly by the surface condition of the braking surface of the driving member for intensively urging the lining plate opposite to the lining plate and that the surface condition is not sufficiently supervised so as to vary the brake releasing force input from the lever to the driving member, thereby creating the problem in that a proper brake releasing force cannot release the braking action. An object of the invention is to provide a mechanical brake for a hoist and traction machine which can control variation in the surface condition at the braking surface of the braking member, maintain the brake releasing force in a proper value, obtain a sufficient braking force, and be lightly operated even at the initial stage of load lowering or traction releasing operation.

In order to attatin the above object, in the present invention, the mechanical brake for the hoist and traction machine provided with the lining plates and braking member having the braking surfaces opposite to the respective lining plates is provided at the braking surfaces with brake releasing force control layers comprising plating layers of nickel phosphate, nickel chromium, or chromium, the plating layers being heat-treated.

Also, each brake releasing force control layer is preferably to have surface hardness of Vickers hardness of 350 or more.

The plating layers are preferably heat-treated at an austenite transformation temperature of the braking member and are dispersed on the surfaces of material of the braking member.

As mentioned above, since the braking force release control layer is provided at the braking member, especially the braking surface of the driving member, the surface condition of the braking surface in contact with the lining plate can be controlled, thereby eliminating variation between products, and the control layer is formed by heat-treating the plating layer. Hence, the surface hardness thereof is improved in comparison with the surface of plating layer in the prior art and variation in the coefficient of friction can be eliminated to that extent and controlled to be a proper value. Also, the control layer is not affected by trouble, such as the attack of lining plate or the rusting, and can eliminate variation in the surface condition caused by the trouble.

Accordingly, the brake releasing force control layer can maintain a proper value of the brake releasing force during the traction-releasing or the load lowering, whereby a force at the initial stage of brake-releasing can be controlled to be smaller in value than the tightening force corresponding to the load. As the result, a sufficient braking force can be obtained and also load lowering or the traction releasing can lightly be performed.

The control layer has the surface hardness of Vickers hardness of 350 or more, whereby damage thereof by the attack of lining plate can be reduced and the coefficient of friction can be controlled further lower. Hence, the force at the initial stage of brake releasing at the load lowering or traction releasing can be controlled to a proper value smaller than the tightening force, and moreover, into a smaller error range. Also, the plating layer is dispersed and permeated onto the surface of raw material of the braking memebr, so that the surface hardness can be Vickers hardness of, for example, 600 or more, thereby enabling the error range to be further smaller and the initial force to be controlled into a smaller proper value.

These and other objects of the invention will become more apparent in the detailed description and examples which follow.

DETAILED DESCRIPTION OF THE INVENTION

Figure 2:
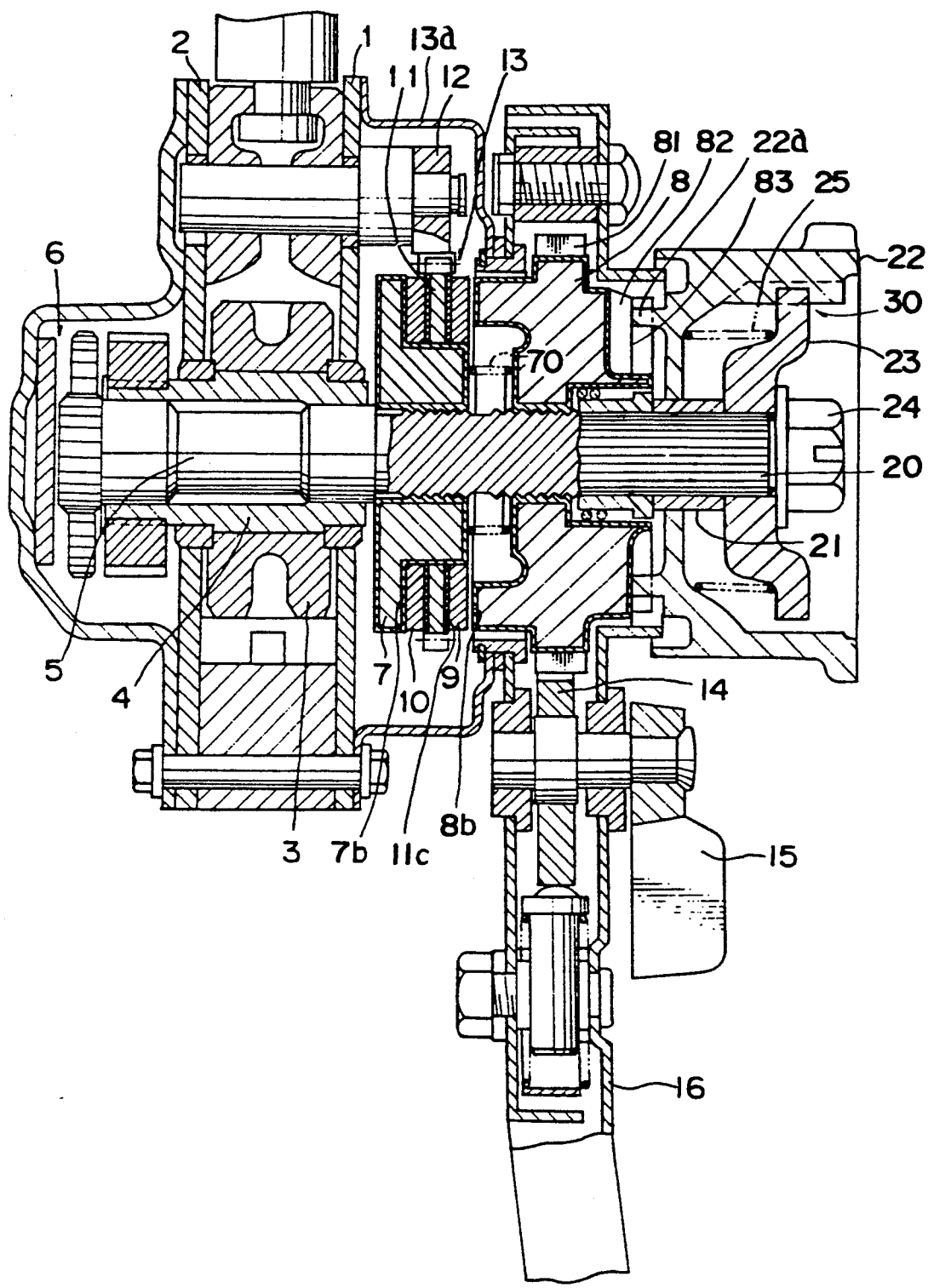
FIG. 2 is a sectional view of a lever type hoist and traction machine as a whole, applied with the present invention.

The mechanical brake of the present invention, when applied to, for example, a lever type hoist and traction machine, that is, a manual hoist and traction machine, as shown in FIG. 2, can more effectively demonstrate the effect thereof. The lever type hoist and traction machine shown in FIG. 2 is so constructed that a tubular shaft 4 having a load sheave 3 is rotatably supported between first and second side plates 1 and 2 disposed opposite to each other and spaced at a predetermined interval, a driving shaft 5 is relatively rotatably supported within the tubular shaft 4, and a reduction gear mechanism 6 having a plurality of reduction gears is interposed between the load sheave 3 and the axially outside end of the driving shaft 5 projecting outwardly from the second side plate 2, so that the reduction gear mechanism 6 is adapted to reduce the speed of rotation of the driving shaft 5 and to transmit the rotation thereof toward the load sheave 3.

A driven member 7 having a flange, screws with the axially outside portion of the driving shaft 5 projecting outwardly from the first side plate 1, a driving member 8 having teeth 81 screws with the driving shaft 5 at the axial outside of the driven member 7, a braking ratchet wheel 11 serving as an anti-reverse-rotation member is interposed between the driving member 8 and the driven member 7, at the first side plate 1 is provided a braking pawl 12 engageable with the braking ratchet wheel 11, the braking ratchet wheel 11 is adapted to allow the driving shaft 5 only to rotate in the drivng direction thereof so as to check the reverse rotation, and lining plates 9 and 10 are interposed between the driving member 8 and the braking ratchet wheel 11 and between the driven member 7 and the same respectively. The braking ratchet wheel 11 sandwiched between the lining plates 9 and 10, the driving member 8, and the driven member 7 constitute a mechanical brake 13.

Figure 1:
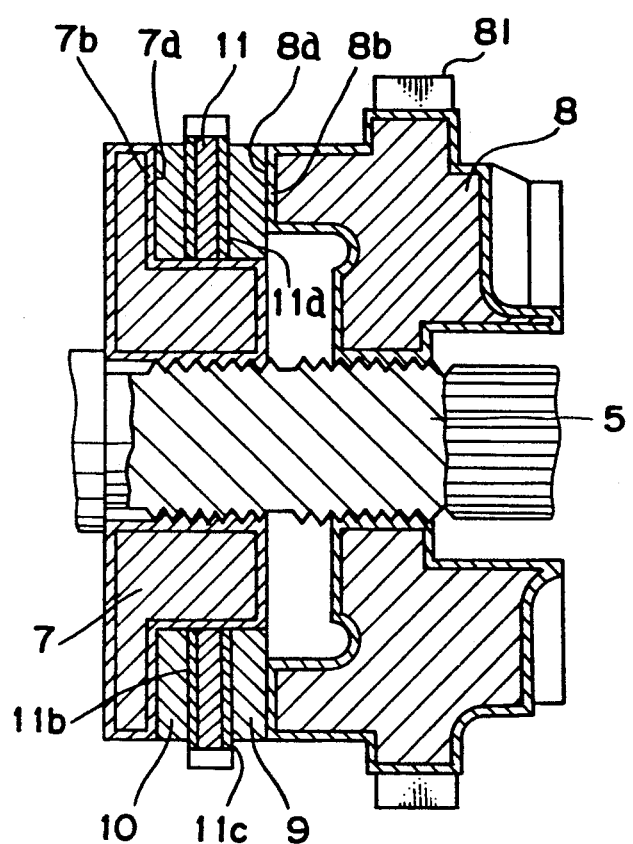
FIG. 1 is a sectional view in part of a preferred embodiment of a mechanical brake of the present invention.

As shown in FIG. 1, the driving member 8, driven member 7 and braking ratchet wheel 11 have, at the surfaces thereof opposite to the lining plates 9 and 10, braking surfaces 8a, 7a, 11a and 11b respectively, so that the driving member 8 is rotatably driven by operating an operating lever to be discussed below so as to screw toward the driven member 7, whereby the braking surface 8a of the driving member 8 comes into press-contact with the lining plate 9, and the lining plates 9 and 10 come into press-contact with the braking surfaces 11a and 11b of the braking ratchet wheel 11 and with the braking surfaces 7a and 8a of the driven member 7 and driving member 8 respectively, whereby a driving force transmitted from the operating lever 16 to the driving member 8 is transmitted to the driving shaft 5 so as to drive the load sheave 3 to hoist or haul a load.

When the driving member 8 is given no input from the operating lever 16, the braking ratchet wheel 11 is stationary by the braking pawl 12 to thereby brake the driving shaft 5 against reverse rotation caused by the load. In addition, reference numeral 70 designates a restraint spring for restraining the driven member 7 from axial movement.

Furthermore, at the outside of a brake cover 13a covering the outer peripheral portion of the mechanical brake 13 and radially outwardly of the driving member 8 is provided an operating lever 16 having a pawl member 14 provided with a normally or reversely rotating pawl engageable with the teeth 81 provided at the outer periphery of the driving member 8 and an operating portion 15 for engaging or disengaging the pawl member 14 with or from the teeth 81, so that the lever 16 is operated to normally or reversely rotate the driving member 8 through the pawl member 14 selectively engageable with one of the teeth 81, thereby actuating the mechanical brake 13 to allow the chain engaging with the load sheave 3 to hoist, lower, or haul a load, or release traction thereof.

In addition, the hoist and traction machine shown in FIG. 2 is provided with a free rotation control mechanism for releasing the operation of the mechanical brake 13 during the no loading and for making the driving shaft 5 freely rotatable. The free rotation control mechanism, which is not an important point of the present invention, is omitted of its detailed description, but in brief, the mechanism is so constructed that the driving shaft 5 is provided at the axial end side thereof with serration 20, onto which a sleeve 21 and a stopper 23 are fitted, the stopper 23 is fixed to the axial end of the driving shaft 5 by screwably tightening a nut 24 screwable with a threaded portion (not shown) at the axial end of the driving shaft 5, between the stopper 23 and the driving member 8 is axially movably interposed a free rotation operating handle 22 so as to be not-relatively-rotatably coupled with the stopper 23 through coupling means 30, and between the handle 22 and the stopper 23 is interposed a spring 25 for biasing the handle 22 toward the driving member 8. The operating handle 22 is provided at the surface thereof opposite to the driving member 8 with engaging projections 22a projecting toward the driving member 8 as shown in FIG. 2, and the driving member 8 is provided at the opposite surface thereof to the operating handle 22 with a regulation portion 82 for regulating a relative rotation range of the driving member 8 with respect to the operating handle 22 and for enabling the driving member 8 to relatively-rotate with respect to the driving member 8 within the regulation range and a free rotation control surface 83 which is positioned closer to the operating handle 22 than the regulation portion 82 and comes into elastic contact with the engaging projection 22a by a biasing force of the spring 25 caused by the axial movement of the operating handle 22 toward the stopper 23 and by the rotation of the handle 22 at a predetermined angle as shown in FIG. 2. Therefore, the operating handle 22 is operated during the no loading and the engaging projection 22a is brought into elastic contact with the free rotation control surface 83, whereby the operation of mechanical brake 13 is released, the driving shaft 5 is made freely-rotatable, and the free rotation control can be held within the predetermined range.

In the embodiment shown in FIGS. 1 and 2, the mechanical brake 13 for the lever type hoist and traction machine constructed as the above-mentioned is so constructed that at the braking surfaces 7a, 8a, 11a and 11b of the driven member 7, driving member 8 and braking ratchet wheel 11 serving as the braking member at the mechanical brake 13 are provided brake releasing force control layers 7b, 8b and 11c each comprising a plating layer of nickel phosphate, nickel chromium or chromium, which is heat-treated.

In other words, the driven member 7, driving member 8 and braking ratchet wheel 11 are applied with electroless plating to be formed in plating layers and then heat-treated in a heating furnace at a temperature of 300° C. for 1 to 2 hours so as to have the surface hardness of Vickers hardness of 350 through 450 respectively.

In addition, the above-mentioned heat treatment may be performed in a heating furnace at a temperature of 400° C. for 1 to 2 hours. In this case, the surface hardness of the control layer can be Vickers hardness of 400 through 500 higher than the heat treatment at 300° C.

The brake releasing force control layers 7b, 8b and 11c can control the surface conditions of the braking surfaces 7a, 8a, 11a and 11b, thereby eliminating variation in the coefficient of friction between the products. Also, since not only the plating layer is formed but also the heat treatment is carried out so as to raise the surface hardness, the coefficient of friction can be lower to that extent and the initial force for the brake releasing during the lowering the load can be controlled to a proper value.

In other words, the load lowering is performed in such a manner that the reverse rotation pawl of the pawl member 14 engages with one of the teeth 81 of the driving member 8 and the lever 16 is operated in swinging motion so that the driving member 8 is reversely rotated to move rightwardly in FIG. 2, whereby the braking surface 8a of driving member 8 is released from biasing the lining plate 9 and the braking action of mechanical brake 13 is released.

However, when the load sheave 3 in association with the driving shaft 5 is subjected to a load, the tightening force corresponding to the load acts on the driving member 8 as the above-mentioned. Accordingly, in this state, when the driving member 8 is reversely rotated, overcoming the tightening force and the braking action of mechanical brake 13 is released to lower the load, if the coefficient of friction of the braking surface, especially the braking surface 8a of the driving member 8, varies, the brake releasing force for load lowering also leads to variation, whereby, when the coefficient of friction is larger, especially in the initial stage of releasing the braking action, a large brake releasing force is required. The present invention, however, is provided at the braking surfaces 7a, 8a, 11a and 11b of the braking members 7, 8 and 11 with the brake releasing force control layers 7b, 8b and 11c respectively, so that the variation in the coefficients of friction can be controlled and set to a proper value, and is not affected by attack of the lining plate or by rusting, whereby the proper set value can be maintained for a long time. As the result, even in the initial stage of load lowering by operating the lever 16, the proper brake releasing force controlled by the control layer can lightly release the braking action.

Alternatively, at the austenite transformation temperature of material constituting the braking members: the driven member 7, driving member 8 and braking ratchet wheel 11, for example, at 850° C., the plating layers may be heat-treated and dispersed and permeated into the material to constitute the control layers 7b, 8b and 11c.

In this case, the heat treatment may be performed by high frequency induction heating other than using the heating furnace. Also, it is preferable that the plating layer, after heat-treated, is cooled by water or oil to be quenched and then tempered at a temperature of 200° through 500° C., usually 300° through 450° C. so as to be of martensite system, in which the surface hardness of the control layer can be Vickers hardness of 600 or more, for example, 800 through 1000.

In addition, in the above-mentioned embodiment the plating layer of nickel phosphate is used, but a plating layer of nickel chromium or chromium can be used and heat-treated to obtain the same effect.

In addition, in all the braking members and the whole surfaces are formed the brake releasing force control layers, in which the initial force for releasing the braking force is problematical especially in the surface condition at the braking surface 8a of the driving member 8, whereby the braking layer 8b may be provided on the braking surface 8a only. In a case where all the braking members are provided with the control layers 7b, 8b and 11c, it is preferable that the plating layers are formed on the whole surfaces of each braking member from the point of manufacture and function, but they may be formed only on the braking surfaces 7a, 8a, 11a and 11b.

Alternatively, the present invention may be applied to a lever type hoist and traction machine having no reduction gear mechanism, or to a manual hoist and traction machine using a hand wheel instead of the lever.

As seen from the above, the mechanical brake for the hoist and traction machine of the present invention provided with the lining plates and the braking members having the braking surfaces opposite thereto, is provided at the braking surfaces of the braking members with the brake releasing force control layers comprising the plating layers of nickel phosphate, nickel chromium or chromium and heat-treated, in other words, the control layers control the surface conditions of the braking surfaces, whereby variation in the brake releasing force during the load lowering or traction releasing to release the braking action can be eliminated, and moreover the control layers for controlling the surface conditions are not only formed of the plating layers but also heat-treated, whereby the surface hardness can be improved in comparison with the mere formation of plating layer, and the coefficient of friction can be controlled to be lower to that extent.

Accordingly, the initial force for releasing the braking action during the load lowering can be controlled to be a proper value smaller than the tightening force corresponding to the load, whereby a sufficient braking force (tightening force) is obtainable and also the load lowering or traction releasing is lightly performable.

Also, the surface hardness of the respective braking layers has a Vickers hardness of 350 or more, so that the initial force for releasing the braking action during the traction releasing or load lowering can be controlled to be the proper value smaller than the tightening force and can be controlled in a smaller error range. The plating layer is dispersed and permeated into the surface of material of the respective braking members, so that the surface hardness can be, for example, Vickers hardness of 600 or more, thereby enabling the error range to be reduced and the initial force to be controlled to a further smaller proper value.

While a preferred embodiment of the invention has been described using specific terms, such description is for illustrative purpose only, and it is to be understood that changes and variations may be made without departing from the spirit or scope of the following claims.

What is claimed is:

1. A mechanical brake for a hoist and traction machine, comprising:
    lining plates; and
    braking members having braking surfaces disposed adjacent to said lining plates,
    each of said braking surfaces of said braking members having brake releasing force control layers formed thereon, each of said brake releasing force control layers comprising a heat-treated plating layer selected from the group consisting of nickel phosphate, nickel chromium and chromium.

2. A mechanical brake for a hoist and traction machine according to claim 1, wherein at least one of said brake releasing force control layers has a surface hardness of Vickers hardness of 350 or more.

3. A mechanical brake for a hoist and traction machine according to claim 1, wherein a heat treatment temperature of said heat-treated plating layer is an austenite transformation temperature of said braking members and said plating layer is dispersed into a surface of material of at least one of said braking members.

4. A mechanical brake for a hoist and traction machine according to claim 1, wherein said mechanical brake comprises
    a driving member screwable with a driving shaft,
    a driven member integrally rotatable with said driving member,
    an anti-reverse-rotation member interposed between said driving member and said driven member and allowed to rotate only in a rotational driving direction of said driving shaft and restrained from reverse rotation, and
    said lining plates interposed between said driving member and said anti-reverse-rotation member and between said driven member and said anti-reverse-rotation member,
    said driving member, driven member and anti-reverse-rotation member including said braking surfaces disposed adjacent to said lining plates.

5. A mechanical brake for a hoist and traction machine, comprising:
    lining plates; and
    braking members having braking surfaces disposed adjacent to said lining plates,
    each of said braking surfaces of said braking members having brake releasing force control layers disposed thereon, each of said brake releasing force control layers comprising a heat-treated plating layer selected from the group consisting of nickel phosphate, nickel chromium and chromium.

6. A mechanical brake for a hoist and traction machine according to claim 5, wherein at least one of said brake releasing force control layers has a surface hardness of Vickers hardness of 350 or more.

7. A mechanical brake for a hoist and traction machine according to claim 5, wherein a heat treatment temperature of said heat-treated plating layer is an austenite transformation temperature of said braking members and said plating layer is dispersed into a surface of material of at least one of said braking members.

8. A mechanical brake for a hoist and traction machine according to claim 5, wherein said mechanical brake comprises
    a driving member screwable with a driving shaft,
    a driven member integrally rotatable with said driving member,
    an anti-reverse-rotation member interposed between said driving member and said driven member and allowed to rotate only in a rotational driving direction of said driving shaft and restrained from reverse rotation, and
    said lining plates interposed between said driving member and said anti-reverse-rotation member and between said driven member and said anti-reverse-rotation member,
    said driving member, driven member and anti-reverse-rotation member including said braking surfaces disposed adjacent to said lining plates.

* * * * *